(12) United States Patent
Glazer

(10) Patent No.: US 9,262,738 B2
(45) Date of Patent: Feb. 16, 2016

(54) METHODS OF MARKING PRODUCTS AND PRODUCTS PRODUCED BY SUCH METHODS

(76) Inventor: Yariv Glazer, Ann Arbor, MI (US)

(*) Notice: Subject to any disclaimer, the term of this patent is extended or adjusted under 35 U.S.C. 154(b) by 0 days.

(21) Appl. No.: 13/501,323

(22) PCT Filed: Jun. 22, 2011

(86) PCT No.: PCT/US2011/041341
§ 371 (c)(1),
(2), (4) Date: Apr. 11, 2012

(87) PCT Pub. No.: WO2011/163296
PCT Pub. Date: Dec. 29, 2011

(65) Prior Publication Data
US 2012/0199651 A1    Aug. 9, 2012

Related U.S. Application Data

(60) Provisional application No. 61/358,051, filed on Jun. 24, 2010.

(51) Int. Cl.
*G06F 7/00* (2006.01)
*G06K 19/06* (2006.01)
*G06Q 10/08* (2012.01)

(52) U.S. Cl.
CPC ...................... *G06Q 10/08* (2013.01)

(58) Field of Classification Search
USPC .................. 235/376, 491, 492, 494
See application file for complete search history.

(56) References Cited

U.S. PATENT DOCUMENTS

| | | | | |
|---|---|---|---|---|
| 5,139,812 A * | 8/1992 | Lebacq | ............................ | 427/7 |
| 6,082,776 A * | 7/2000 | Feinberg | ........................ | 283/72 |
| 6,705,516 B1* | 3/2004 | Kubota | ......................... | 235/375 |
| 7,874,489 B2* | 1/2011 | Mercolino | .................... | 235/491 |
| 2002/0158765 A1* | 10/2002 | Pape et al. | .................. | 340/573.3 |
| 2010/0099080 A1* | 4/2010 | Church et al. | .................... | 435/6 |
| 2011/0068177 A1* | 3/2011 | Harris | ............................ | 235/492 |
| 2012/0126017 A1* | 5/2012 | Sharma et al. | ................ | 235/494 |
| 2012/0273564 A1* | 11/2012 | Mercolino et al. | ............ | 235/375 |

OTHER PUBLICATIONS

"Book written in DNA code—Scientists who encoded the book say it could soon be cheaper to store information in DNA than in conventional digital devices" by Geraint Jones in The Guardian, Thursday Aug. 16, 2012, at http://www.theguardian.com/science/2012/aug/16/book-written-dna-code.*

* cited by examiner

*Primary Examiner* — Daniel Hess

(57) ABSTRACT

A method of marking a product to permit later identification and tracking of the product, includes: utilizing a processor for producing information as to the identification and history of the product since its production; converting the information into a code in the form of a unique monomers sequence embedded in or added to the product; and introducing the code into the respective product in a retrievable and non-destructible manner such as to enable the identification and history of the respective product to be retrieved despite transformations which may have occurred in the product since its production. Also described are applications of, and products produced in accordance with, the forgoing method.

1 Claim, 5 Drawing Sheets

| Hex | nucleic acid chain | Hex | nucleic acid chain | Hex | nucleic acid chain | Hex | nucleic acid chain |
|---|---|---|---|---|---|---|---|
| 0 | AA | 4 | CA | 8 | GA | C | TA |
| 1 | AC | 5 | CC | 9 | GC | D | TC |
| 2 | AG | 6 | CG | A | GG | E | TG |
| 3 | AT | 7 | CT | B | GT | F | TT |

Adenine (A), Cytosine (C), Guanine (G), Thymine (T)

Fig 1

| 2) utilize a processor for producing information as to the identification and history of the product since its production |

⇩

| 3) convert the source characteristics into a unique code |

⇩

| 4) introduce the unique code into the product |

⇩

| 5) track all operations performed on the product after its code has been introduced |

⇩

| 6) record in a database a history profile of each product according to its code |

⇩

| 7) determine the source of an examiend specimen according to its code |

⇩

| 8) examine the history profile in the use of the products according to the code of each product in order to detect patterns and coincidences |

Fig 2.

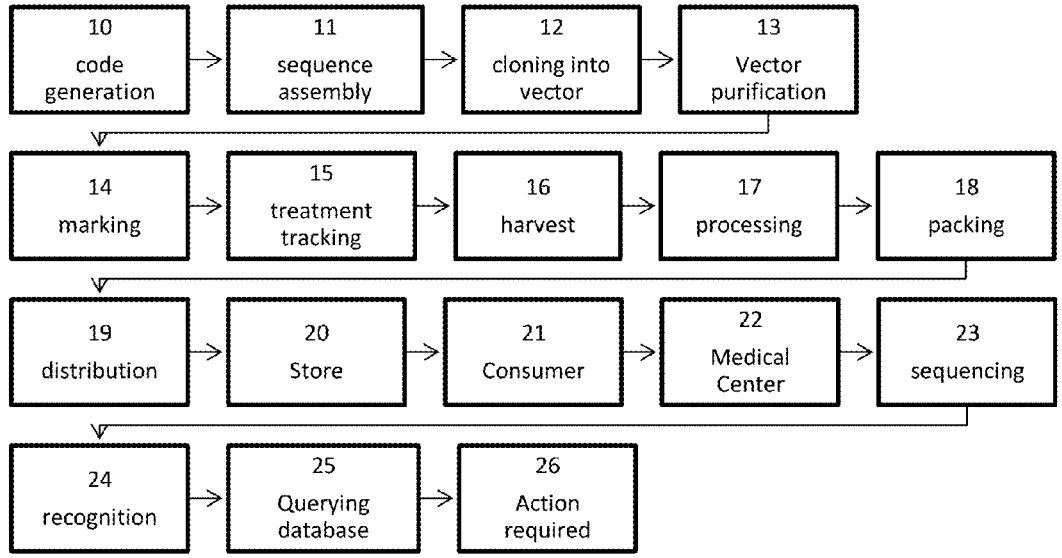

Fig 7

| 250 - select elements for the code: Grower ID (1234); Complex ID (01); Farm ID (023); Plot ID (034) |
|---|
| 260 - create decimal code from the selected elements (concatenation: 123401023034) |
| 270 - convert decimal code to Hexadecimal representation ( 123401023034 -> 1CBB462E3A) |
| 280 - create nucleic acid sequence representation of the hexadecimal code ( 1CBB462E3A -> ACTAGTGTCACGAGTGATAC) |

Fig 8

| Hex | nucleic acid chain | Hex | nucleic acid chain | Hex | nucleic acid chain | Hex | nucleic acid chain |
|---|---|---|---|---|---|---|---|
| 0 | AA | 4 | CA | 8 | GA | C | TA |
| 1 | AC | 5 | CC | 9 | GC | D | TC |
| 2 | AG | 6 | CG | A | GG | E | TG |
| 3 | AT | 7 | CT | B | GT | F | TT |

Adenine (A), Cytosine (C), Guanine (G), Thymine (T)

METHODS OF MARKING PRODUCTS AND PRODUCTS PRODUCED BY SUCH METHODS

FIELD AND BACKGROUND OF THE INVENTION

The invention relates to methods of marking products, and to products produced by such methods in a coded, retrievable and relatively non-destructible manner such that a respective product can be later identified and its history tracked despite transformations that may have occurred, short of the complete destruction of the product. The invention also relates to applications of such methods, and to products produced by such methods.

Various techniques have been used for marking or tagging products in order to enable tracking a product or determining the source of a product under examination. For example, tagging ingredients have been added to chemical compositions, and radio-frequency identifications (RFID) labels have been applied to product containers. However, in the known techniques, the tag is usually destroyed with the transformation or conversion of the product into another form, thereby precluding the identification of the source of the product. Moreover, the tagging ingredients usually relates only to the source or identity of the respective product, and provide little or no information as to the history of the respective product.

OBJECTS OF THE PRESENT INVENTION

An object of the present invention is to provide a method for introducing both source and history information into a product in a coded, retrievable and relatively non-destructible manner, to enable determining the source and history of a product even after it has been converted to another form. Another object of the invention is to provide a method of tracking such products in order to detect patterns in the use of such products. A still further object of the invention is to provide products made according to the novel method.

According to a broad aspect of the present invention, there is provided a method of marking a product to permit later identification and tracking of the product, comprising: producing information as to the identification and history of the product since its production; converting said information into a code; and introducing said code into the respective product; characterized in that said code is in the form of a unique monomers sequence embedded in or added to the product in a retrievable and non-destructible manner such as to enable the identification and history of the respective product to be retrieved despite transformations which may have occurred in the product since its production.

The invention, thus, broadly involves the concept of encoding products with source and history information and using the product as an information storage device in a manner enabling such information to be retrieved at a later time by others even after the product receiving the information has been transformed into another form.

It is known to introduce identification information in a coded form into a new cell structure for purposes of identifying the new cell structure in order to detect unauthorized copying. Such a method is to be distinguished from the present invention wherein the information introduced by the code includes both source and history information, to thereby identify not only the source but also the history of an examined product despite transformations which may have occurred in the product.

The unique monomers sequence can be in many forms, such as in the form of a unique monomers, sequence (MS), a unique nucleic acid sequence (NAS), a unique amino acid sequence (AAS), a unique polysaccharides sequence (PS), a unique inorganic monomer sequence (IMS), etc., embedded in or added to the product.

The code can be encapsulated in a yeast, a plant, or bacteria. It can also be encapsulated in nanoparticles.

The present invention is particularly useful where the product is an agricultural product, and the source and history information includes the name of the agricultural product, the grower of the agricultural product, the location where the agricultural product was grown, and the identification of each distributor or processor of the product until it reaches the ultimate consumer. For example, by using the invention to tag all legally grown marijuana, the authorities will be able to easily identify the source and history of any particular specimen of marijuana and thus enable illegal marijuana to be distinguished from legal marijuana. Marijuana farmers licensed to grow medical marijuana but who sell it illegally can thus be identified and thereby lose their license. Marijuana designated for legal use can also be checked by authorities to make sure that it was grown by a farmers with an appropriate license.

The invention could also be used in many other applications, such as where the product is a manufactured industrial product, and the source and history information includes: the name of the product, the manufacturer of the product, the batch number of the product, and the Identification of each distributor or processor of the product; until it reaches the ultimate consumer.

The source and history information could be: (a) incorporated into the product itself, (b) added directly to the product or (c) encapsulated in a capsule added to the product. The description below includes examples of (a). An example of (b) would be an additive, such as a salt used in food and tagged with the identification of a particular restaurant to identify the restaurant where food was eaten. An example of (c) would be an additive created by using an encapsulating technique, such as nano-caging, wherein natural or synthetic monomers create hydrogel nanoparticles, silica nanoparticles, polymerized micelles, etc.

In the preferred embodiments of the invention describe below, a number is assigned to each element of the source and history information, and the numbers are converted into the code introduced into the product by arranging the numbers into a numerical sequence; converting the numerical sequence into a hexadecimal sequence; and converting the hexadecimal sequence into the code.

As will also be describe below, such a method can be used not only for identifying the source of examined specimens of products which have undergone substantial transformation, but also for tracking each operation performed on a product after its identification or source was introduced into the product to thereby establish a history profile of such operations. Another example would be to detect patterns in the use of such products for determining a common cause regarding a particular event (e.g. an epidemic).

The invention also provides products produced in accordance with the novel method, and various applications of the novel method.

Further features and advantages of the invention will be apparent from the description below.

BRIEF DESCRIPTION OF THE DRAWINGS

The invention is herein described, by way of example only, with reference to the accompanying drawings, wherein:

FIG. 1 is a block diagram illustrating a preferred embodiment of the invention;

FIG. 2 is a broad flowchart broadly illustrating a preferred process in accordance with the invention;

FIG. 7 is a flow diagram illustrating the manner of producing the code by: assigning numbers to the elements of the source and history information; arranging the numbers into a numerical sequence; converting the numerical sequence into a hexadecimal sequence; and converting the hexadecimal sequence into said code; and FIG. 8 is a table illustrating one example of implementing the last block of FIG. 7.

Figure 3:
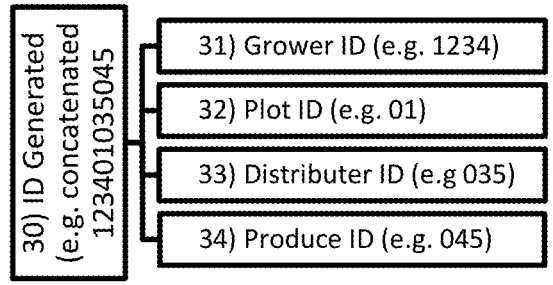
FIG. 3 is a block diagram illustrating a preferred method of converting the information into a code to be introduced into the product.

It is to be understood that the forgoing drawings, and the descriptions below, are provided primarily for purpose of facilitating understanding the conceptual aspects of the invention and possible embodiments thereof, including what is considered to be preferred embodiments. In the interest of clarity and brevity, no attempt has been made to provide more details then necessary to enable one skilled in the art, using routing skill and design, to understand and practice the described invention. It is to be further understood that the embodiments described are for purpose of example only, and that the invention is capable of been embodied in other forms and applications than described herein.

DESCRIPTION OF INVENTION AND PREFERRED EMBODIMENTS

FIG. 1 is an overall flow chart illustrating the method of the present invention for introducing source information into a product in a coded, retrievable, and relatively non-destructible manner. In the preferred embodiments of the invention described below, the source information is introduced into the products such that the source of each product, even after the products has undergone transformation, can be later identified, and also such that subsequent operations performed on the product can be tracked to prepare a history profile of the product, to thereby enable detection of patterns or coincidences that may require action.

Thus, as shown by FIG. 1, the first operation is to prepare a profile of source characteristics identifying the source and history of the respective product (block 2); convert the source characteristics into a unique code (block 3); and introduce it into the product (block 4). FIG. 2 block 10, FIG. 5 block 50, and FIG. 6 block 150 described below illustrate examples of performing the operations of block 2 of FIG. 1; FIG. 2 blocks 11-13 and FIG. 5 blocks 70-80 illustrate examples of performing the operations of block 3 of FIG. 1; FIG. 2 blocks 14 and FIG. 5 block 85 illustrate examples of performing the operations of block 4 of FIG. 1; FIG. 2 blocks 15-21 and FIG. 5 blocks 90-100 illustrate examples of performing the operations of blocks 5 and 6 of FIG. 1; FIG. 2 blocks 22-25 and FIG. 5 blocks 110-140 illustrate examples of performing the operations of block 7 of FIG. 1; and FIG. 2 block 26 and FIG. 5 block 145 illustrate examples of performing the operations of block 8 of FIG. 1.

As shown by blocks 5 and 6 of FIG. 1, all operations performed on the product, after its unique code has been introduced into it, are tracked and recorded in a database, thereby providing a history profile of each product according to its code. As indicated by blocks 7 and 8, the forgoing operation permit the source and history information of the product to be later identified, even though the product has undergone substantial transformations, and also permit patterns to be detected resulting from the use of the product according to the code of the product.

Agricultural Products

With reference to the block diagram illustrated in FIG. 2, the first step 10 is the code generation in which; a numerical code is mathematically generated from the source and the history path of the product (FIG. 5, block 50); the code is translated into, e.g. a nucleic acid sequence, and a database record is created for that code.

Block 11, 12 and 13 represent the lab work of creating the unique nucleic acid sequence. This starts with the assembly of the sequence (11) where the nucleic acid monomers are joined together in a specific order to form a polymer representing the code. The next step (12) is to replicate the code a multiple of times (e.g., cloning into vector) to create a mass that can mark the plant (block 14). Before the marking process 14, the replicated vectors undergo a purification process (13) to ensure the correct chain for the marking.

Marking the plants (block 14) can be done by a known process, such as DNA bombardment, *agrobacterium* infiltration, viral vectors, etc.

The so marked plant is sent to the field for replanting, growing, and harvesting. Each of the steps along the plant's life is recorded in the database (block 15) from the replantation and up to the harvest (block 16) when the harvested product leaves the farm.

Blocks 17, 18, and 19 represent the processing of the harvest into an agricultural product. This includes processing (block 17), packing (block 18), and distributing the product (block 19), to the stores (block 20). Each of the steps has checkpoints where the operator updates the database when the product is passing through the respective step.

In the event a consumer (block 21) enters a medical center (block 22) for diagnosis or treatment, the medical center samples the stomach contents and sends the sample for sequencing (block 23), where the code, e.g., nucleic acid chain, can be retrieved and the order of its various elements, e.g., monomers, can be determined (block 24). The medical center had previously entered the determined sequence into the database (block 23) with the symptoms found in the patient.

A database process checks to see if this sequence, or a checkpoint along its path, was queried from any medical center. In the event that the database process finds that such a query was indeed made, the database alerts (block 24) the authorities for further actions. Thus, the checks can identify similar patterns and there by facilitates locating the source of, e.g., a contamination, in the history of a particular food product.

FIG. 3 illustrates one manner of converting the identification characteristics of the product into a unique code when marking of agricultural products with unique code source identifications. Thus, a number is assigned to each element of the source information to be introduced into the product to generate a source code constituted of a sequence or concatenation of numbers (block 30). In the example illustrated in FIG. 3, the generated source includes identification of the grower (31), the plot (32), the distributor (33), and the product (34) e.g., the name of the agricultural product.

Figure 5:
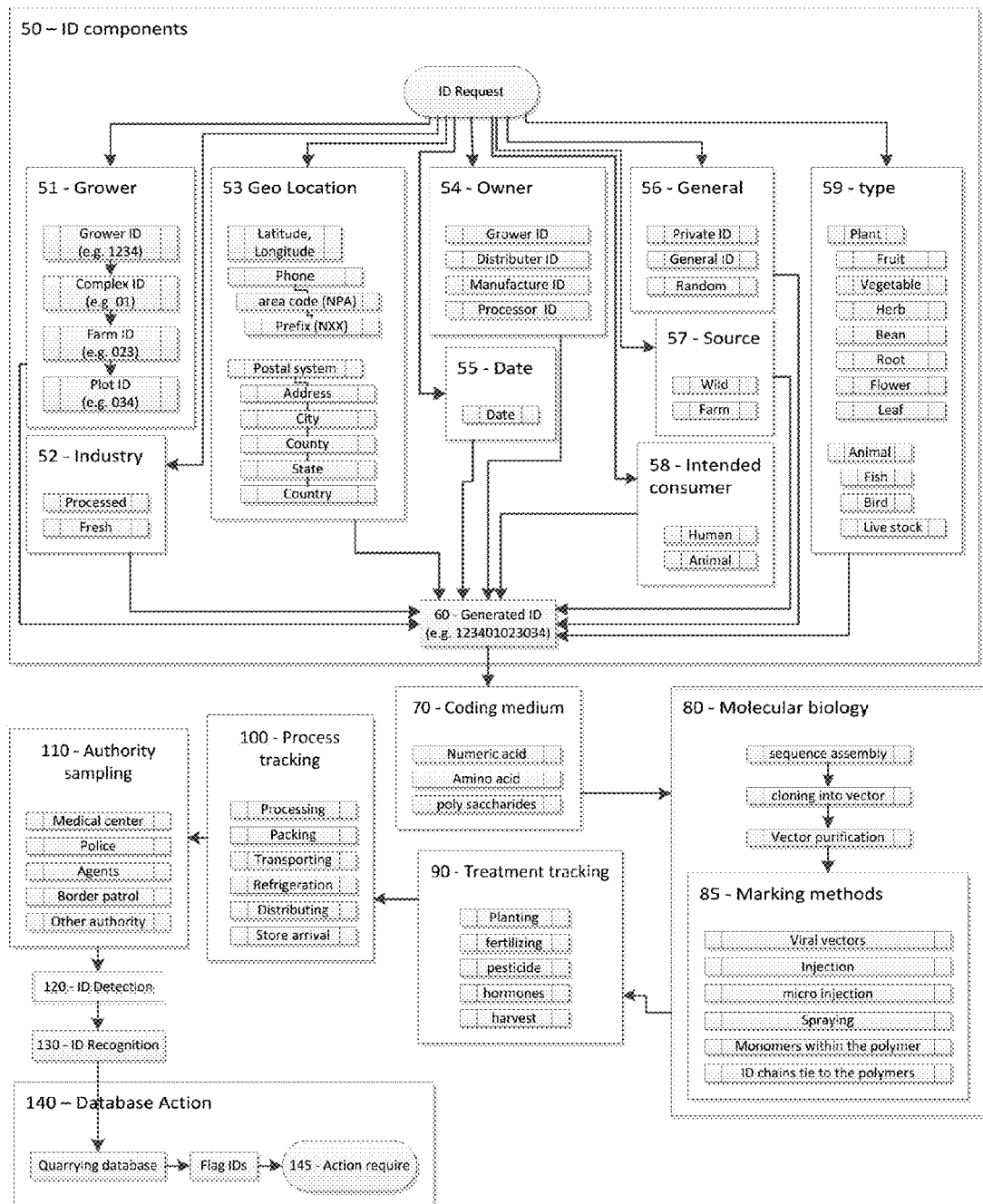
FIG. 5 is a more detailed flowchart, illustrating many possible embodiments of the invention when used for identifying agricultural products and tracking such products after so identified in order to detect patterns or coincidences requiring action.

FIG. 7 illustrates the manner in which the numerical sequence illustrated in FIG. 5 is produced. Thus, the numbers assigned to the elements of the source and history information are converted into a code introduced into the product by: arranging the numbers in a numerical sequence; converting the numerical sequence into a hexadecimal sequence; and converting the hexadecimal sequence into the code. FIG. 8 is an example a conversion table for converting hexadecimal digits to nucleic acid dimers.

A particularly important application of the invention is distinguishing an illegal marijuana drug form a legal marijuana medication. Thus, one of the greatest fears of the medical marijuana industry is that their products will enter the black market. By the use of this invention to tag all legally grown marijuana, the authorities will be able to easily identify the source of any particular specimen of marijuana. This will stop the flow of marijuana from the legal market to the illegal market and can be used to identify marijuana farmers that are abusing the legal marijuana system. Marijuana farmers who grow marijuana and sell it illegally can then lose their license to grow the legal marijuana. Marijuana designated for legal use can also be checked by authorities to make sure that all medical marijuana was grown legally by farmers with licenses.

Figure 4:
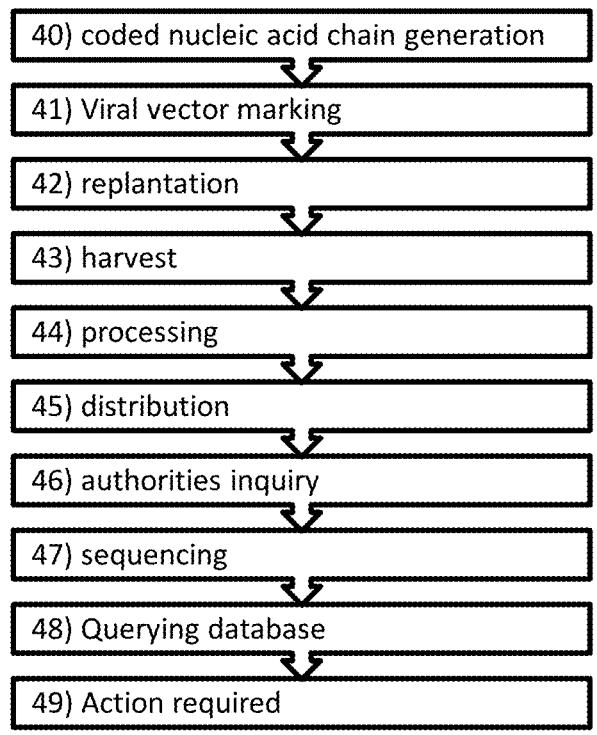
FIG. 4 is a flowchart broadly illustrating a preferred process of marking medical marijuana plants in accordance with the invention to enable distinguishing between legal marijuana medications and illegal marijuana drugs.

FIG. 4 is illustrates the implementation of the invention for medical marijuana control. Block 40 shows the creation of the coded nucleic acid chain generation as shown in FIG. 2, blocks 10-13. The next step shows the marking process called viral vector (block 41) where the coded nucleic acid chain enters into a viral vector and infects the marijuana plant cells.

After the plant is marked, the grower receives the plants for replanting (block 42) in the respective growth environment. At harvest (block 43), the grower enters into the database a new entry for the harvested batch indicating the destination of that batch. The marijuana batch moves through processing and distribution (blocks 44 and 45) before arriving to the patient.

When an authority agent inquires (block 46) as to a particular marijuana product a sample is sent for sequencing (block 47), and the results are queried against the database (block 48). In the case of a 'no code found' in a patient batch, or a 'code OK', in a street batch, the agent will receive an 'Action required' alert (block 49).

FIG. 5 illustrates the main steps, and many variations thereof, with respect to marijuana or other agricultural products. Block 50 describes many designated classifications for building the code, including: grower information (block 51); the respective industry such as processed food or fresh uncut food (block 52); geographic location information (block 53) including longitude, latitude, phone area code, NXX, postal zip code, or the general form of country, state, county, city, and address codes; ownership information (block 54), of the agricultural product in the situation where the crop is grown for a specific distributer, manufacturer, processor, or growers co-op; important date information (block 55) in the life of the product, such as seeding, planting, harvesting, end of life, or even just the simple year of operation; general information regarding unique codes (block 56), representing the crop or the product, specific license code, encryption key, validation codes, etc.; growth source information (block 57) indicating if the crop came from a farm, open field, green house, wild, etc.; intended consumer (block 58), e.g. such as animal feed or human consumption and the type of plant or animal (block 59).

Block 60 of FIG. 5 illustrates one possible example of a generated code from the step of block 51, wherein the code is a concatenated number representing the grower ID (1234), the farm complex ID (01), the farm within the complex (023), and the plot within the farm (034).

FIG. 5, block 70 illustrates possible options for coding the information into a medium that can be added to organic cells such as nucleic and amino acid, or polysaccharides. Block 80 illustrates the process when using nucleic acid chain to store the code and block 85 describes some known marking methods for introducing the code into a life cell. When the code has been introduced to the life plant cell, the farmer records the steps in the course of the growth of the plant (block 90) such as: replanting, fertilizing, pesticide, hormone treatments, and harvesting to name a few. After the harvest, the processing, refrigerating, packing, and distribution processes and facilities are tracked (block 100), until the crops become agricultural products. Along this path, every time that the crop batch enters and exits a process, the operator of that process enters a record into the database creating a history path for that batch.

Block 110 of FIG. 5, titled "authority sampling", shows possible entities that might need to retrace the product's source and history information, such as medical centers—in case of medical emergency, police, inspection agents, border patrol, and others. After an agent samples the product, ID detection (block 120) and recognition (block 130) are performed to extract and identify the coding medium using well known sequencing technologies. The sequence is entered into the database (blocks 140) to retrieve the source and history information recorded during the previous steps. In the case where the same ID was queried more than once, the database can flag and alert the agent for further action (block 145).

Figure 6:
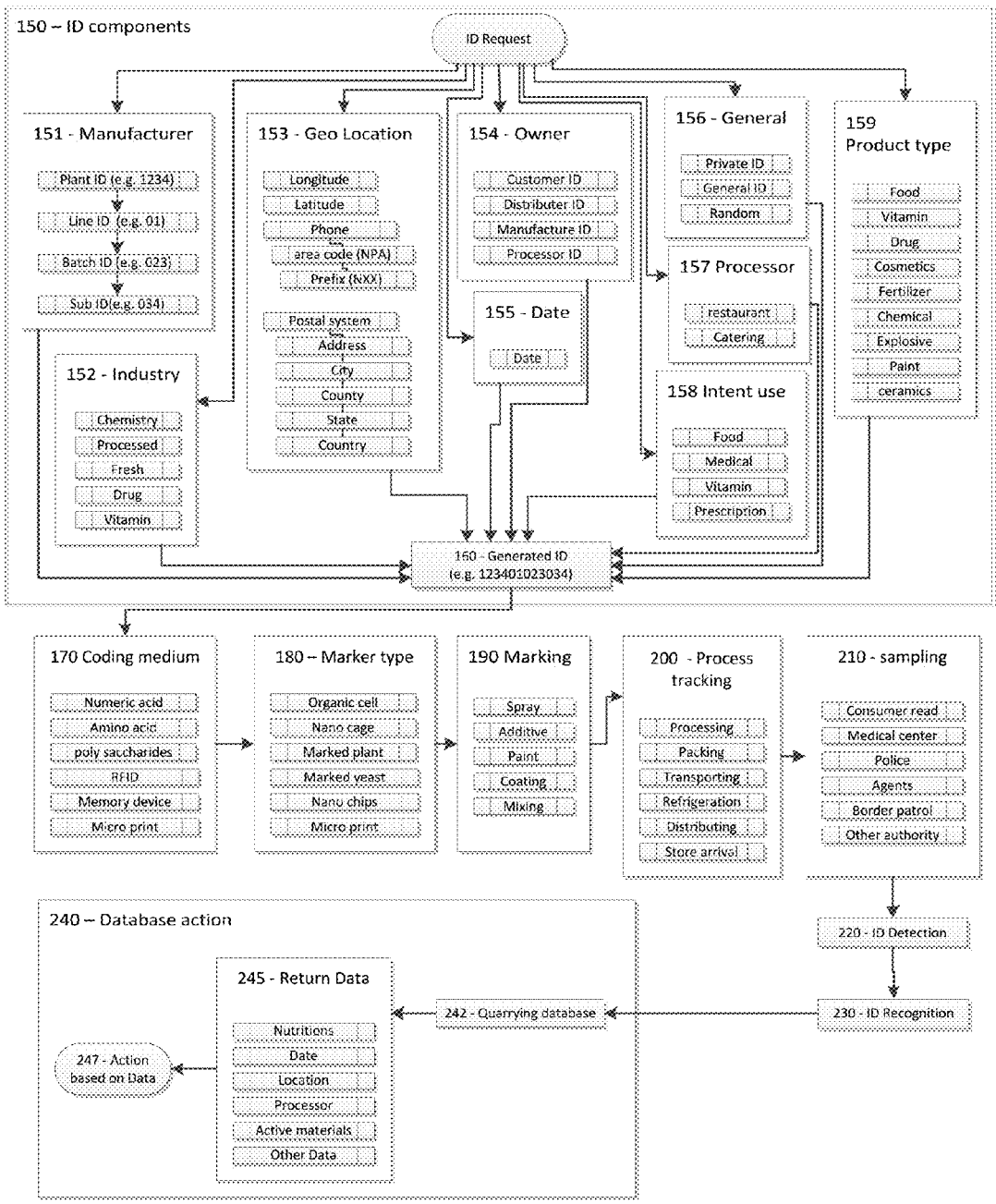
FIG. 6 is a detailed flowchart illustrating many possible embodiments of the invention when used for identifying manufactured industrial products and tracking such products after so identified in order to detect patterns or coincidences requiring action.

FIG. 6 illustrates many possible embodiments of the invention for manufacturing industrial products. Block 150 describes many classifications or ID components for building the code including: manufacturer information (block 151); industry information (block 152); geographical location information (block 153); ownership information of the product, including distributer, manufacturer, processor, or customer (block 154); important dates in the life of the product, such as manufacturing, assembly, processing, end of life, or even just the simple year of operation (block 155); unique codes (block 156) representing the product, specific license code, encryption key, validation codes, etc.; processor information (block 157) e.g. indicating restaurant, catering, pharmacy, packing facility, etc.; target market (block 158), such as food, medicine, vitamin, etc.; and product type (block 159) such as food, vitamin, drug, cosmetics, fertilizer, chemical, explosives, paint, ceramics, etc.

Block 160 of FIG. 6 illustrates one possible example of a code generated from block 151, where the code is a concatenated number representing the factory ID (1234), the line ID (01), the batch number (023), sub-ID within the batch (034), etc.

FIG. 6 block 170 illustrates possible options for coding the information into a medium that can be added to manufactured industrial products such as code utilizing nucleic acid, amino acid, polysaccharide chains, RFID device, or memory chip, etc. Block 180 illustrates the marker type, where a marked organic cell (block 14 of FIG. 2) is used to mark an industrial product, e.g., by nano-cages encapsulating the mediums (block 170), marked plants such as parsley, marked yeast, or nano memory chips (block 180). The product marking can be in many forms, such as spray, additive, paint, coating, or mixing the marker with the product (block 190). When the code has been introduced into the product, the product undergoes many further stations or steps where the processor records in the database the respective station or step, such as a processing operation, packing, transportation, refrigeration, distribution, etc., up to the store (block 200).

Block 210 of FIG. 6 illustrates possible entities that may be involved in retracing the product's source and history information, such as medical centers—in case of medical emergency, police, inspection agents, border patrol, etc. ID detection is performed of the product of interest to extract and identify the coding medium, using well known sequencing technologies (block 220). The sequence is entered into the database (blocks 230 and 240) to retrieve the source and history information recorded (block 242) during the previous steps (blocks 150 and 200). The database reads-out the source and history information associated with this ID (block 245), and in the case where the same ID was queried more than once, the database can flag and alert the agent for further action (block 247).

Following are several additional examples of other possible applications of the invention:

1) Smuggling of Crops—The same method of tagging products can be used to identify the origin of crops. The method can be used to catch those that take products across political boundaries without licenses.
2) Assisting in the assessment of dietary compliance for disorders such as lactose intolerance and celiac disease when symptoms persist despite reported dietary exclusion. This could assist in distinguishing between those who have symptoms which persist despite compliance with a diet vs. those that are knowingly or unknowingly noncompliant.
3) Creating a central database which identifies foods which are common to patients with suspected food borne illness. This would allow rapid identification of an epidemic and facilitate isolation of a contagion.
4) Treating patient having symptoms suggestive of food borne illness, e.g., fever, abdominal cramping, nausea, vomiting, urgency, diarrhea, and bloody diarrhea. If the illness is not severe and the patient can take stool sample, usually they are treated supportively in the emergency room or office. If the patient is severely affected, intravenous (IV) fluids are given and laboratory and stool studies are sent to determine whether the patient requires hospitalization and to determine the cause of the illness. Some patients may also require imaging studies such as ultrasound or CT (Computed Tomography) scanning.
5) Allowing the rapid identification of epidemiological patterns that could alert physicians to an outbreak of food-borne illness and assisting in the isolation of an organism vector.
6) Allowing the identification of contamination patterns, whether severe or mild, may alert authorities or regulators to inadequate sanitation or food processing practices. A pattern of such behavior might allow regulators to prevent a more severe foodborne illness outbreak such as the one involving the peanut factory of America.
7) In the case of animal products, linking the product to a particular herd, fowl or fish school which becomes very simple and allows for accurate recall to save the lives of consumers of the respective meat.

While the invention as it described above with respect to several preferred embodiments, it will be appreciated that these are set for merely for a purpose of example, and many other variations, modification, and applications of the invention may be made.

What is claimed is:

1. A method of marking a product to permit later identification and tracking of the product, comprising:
   utilizing a processor for producing information as to the identification and history of the product since its production;
   converting said information into a code; and
   incorporating said code into the respective product in the form of a unique polysaccharides sequence in a retrievable and non-destructible manner such as to enable the identification of the respective product;
   characterized in that said code also enables the history of the product to be retrieved despite transformations that may have occurred in the product since its production.

* * * * *